United States Patent [19]

Lee

[11] Patent Number: 5,707,757

[45] Date of Patent: Jan. 13, 1998

[54] BATTERY HAVING WATER-PROOF CASE AND PORTABLE ELECTRONIC APPARATUS USING THE BATTERY

[75] Inventor: Yl-Kwoun Lee, Kyonggi-do, Rep. of Korea

[73] Assignee: Samsung Electronics Co., Ltd., Kyungki-do, Rep. of Korea

[21] Appl. No.: 654,907

[22] Filed: May 29, 1996

[30] Foreign Application Priority Data

Jun. 14, 1995 [KR] Rep. of Korea ............... 15755/1995

[51] Int. Cl.$^6$ .................................................. H01M 2/12
[52] U.S. Cl. ..................... 429/86; 429/89; 429/97; 429/99; 429/130
[58] Field of Search .................. 429/53, 86, 89, 429/97, 99, 129, 130, 181

[56] References Cited

U.S. PATENT DOCUMENTS

| | | |
|---|---|---|
| 2,437,145 | 3/1948 | Woodbridge . |
| 3,901,732 | 8/1975 | Kis et al. . |
| 3,904,441 | 9/1975 | Badger . |
| 4,147,841 | 4/1979 | Shroff ................................. 429/86 |
| 4,233,370 | 11/1980 | Heiser et al. ....................... 429/89 |
| 4,254,191 | 3/1981 | Kniazzeh ........................... 429/162 |
| 4,256,813 | 3/1981 | Kniazzeh ........................... 429/86 |
| 4,304,827 | 12/1981 | Clingenpeel ..................... 429/181 X |
| 4,547,438 | 10/1985 | McArthur et al. ................ 429/86 X |
| 4,567,118 | 1/1986 | Connelly ........................... 429/53 |
| 4,885,218 | 12/1989 | Andou et al. ..................... 429/53 |
| 5,209,992 | 5/1993 | Feres .................................. 429/86 |
| 5,362,577 | 11/1994 | Pedicini ............................. 429/27 |

*Primary Examiner*—Stephen Kalafut
*Attorney, Agent, or Firm*—Robert E. Bushnell, Esq.

[57] ABSTRACT

Disclosed is a water-proof, gas pervious casing for a battery capable of containing a plurality of battery cells. The casing is made of a gas impervious, water-proof material that completely encapsulates the battery cells. A recessed region in the casing contains perforations, allowing gases to escape. This perforated recessed region is covered and filled with a plurality of layers of gas pervious sheets, one of which is water-proof. In addition to the recessed region, the exterior of the casing of the battery contains an electrical connector terminal which is surrounded with a water-proof seal. When the battery is installed in an electrical appliance, a cavity wall forms a water-proof seal with the battery to prevent moisture from entering the terminal region of the battery. On the exterior of the casing, adjacent to the recessed region, is a series of spacers are mounted which provide channels for exhaust gas to flow when the battery is snugly installed into the battery cavity of an electronic appliance. Lastly, the exterior casing of the battery contains a gripping device which allows the battery to latch on to a protrusion in on an electrical appliance when the battery is installed into the electrical appliance, preventing the battery from being inadvertently separated from the electrical appliance.

21 Claims, 6 Drawing Sheets

5,707,757

BATTERY HAVING WATER-PROOF CASE AND PORTABLE ELECTRONIC APPARATUS USING THE BATTERY

CROSS-REFERENCE TO RELATED APPLICATIONS

This application makes reference to, incorporates the same herein, and claims all benefits accruing under 35 U.S.C. §119 arising from an application for Battery Having Water-Proof Case and Portable Electronic Apparatus Using the Battery earlier filed in the Korean Industrial Property Office on 14 Jun. 1995 and there duly assigned Ser. No. 15755/1995.

FIELD OF THE INVENTION

The present invention concerns electrical storage batteries generally, and more particularly, a battery having a water-proof case and a portable electronic apparatus using the battery.

BACKGROUND OF THE INVENTION

Batteries are used to supply power to portable electronic apparatuses including note book computers, cellular telephones, portable data terminals, etc. Such portable electronic apparatuses have to be water-proof, and, in case a battery is mounted on such apparatuses, it is necessary to prevent the water from seeping into or out of the battery. At the same time, it is essential that the battery allow exhaust gases escape. The prior art is full of battery designs that are both waterproof and permit the escape of exhaust gases produced from the chemical reaction inside the battery.

U.S. Pat. No. 5,362,577 for Diffusion Vent for a Rechargable Metal-Air Cell to Pedicini discloses a vent system for a battery. The vent system contains a first hydrophobic membrane which is polypropylene and sold under the trademark Celgard 4599, a gas diffuser made of a polyethylene material made by Porex Corporation, and a second hydrophobic membrane made from a polypropylene material such as Celgard 2400. The vent system succeeds in allowing exhaust gases to escape from the battery while preventing the passage of liquids into or out of the battery.

U.S. Pat. No. 3,901,732 for a Thin Flat Cell Construction Having a Gas-Permeable Coated Perforated Anode to Kalnoki Kis et al. discloses a gas permeable electrolyte cell. The electrolyte cell contains vent holes in addition to gas permeable materials in addition to perforated adhesive materials that allow for the escape of unwanted gases while preventing the escape of electrolyte fluids.

A different approach is taken in U.S. Pat. No. 3,853,629 for a Battery Having Laminated Wrapper Member Which Includes Gas Venting Passageway to Elliott, which describes a battery that is water proof while gas pervious. A pair of wrappers encapsulates the battery, one layer being gas pervious and the second layer being water proof as well as gas pervious. The two layers are laminated together except in one region where they remain unlaminated. The unlaminated portion provides a conduit for the exhaust gases to escape.

U.S. Pat. No. 5,209,992 for a Water By-Passing Flame Retardant Battery Vent Plug to Feres discloses a vent plug for an electrolyte battery that can be submerged into water allowing for the escape of byproduct gases while preventing the leakage of the electrolyte fluid from the battery. The device uses a foam fluid flame retardant from Porex technology that allows hydrogen gas to vent.

U.S. Pat. No. 4,885,218 for a Battery Exhaust Gas Plug Filter and Process for Manufacturing the Same to Andou et al. discloses a battery exhaust gas plug filter that is made from micro pores of materials that are silane or titanium based. These materials are water repellent and gas permeable, allowing exhaust gases to exit the battery while preventing water from either seeping into or out of the battery.

U.S. Pat. No. 4,567,118 for a Cell Vent to Connelly discloses an electrochemical cell with an air vent that allows by gas products of the chemical reaction to escape from the cell. A sealant is used in the cell structure to prevent the electrolylic material from escaping from the cell into the surroundings.

U.S. Pat. No. 4,256,813 and U.S. Pat. No. 4,254,191 for a Method and Apparatus for Manufacturing Battery Vents and Vented Batteries, both to Kniazzeh, disclose a novel method for venting gases produced by an electrolyte battery. This design involves paper fibers and a vent tube, allowing gases to escape while preventing liquids from migrating. This combination of paper strips and fibers to allow gases to permeate to the outside of the cell while preventing the electrolyte fluid or moisture from either entering or leaving the cell.

U.S. Pat. No. 4,147,841 for a Vented Container to Shroff discloses a porous closure that allows hydrogen gas to escape while preventing the escape of the electrolytic fluid. Pores ten to two hundred microns wide allow gases to escape while preventing the passage of liquids.

SUMMARY OF THE INVENTION

Therefore, it is an object to provide a battery case that is both water-proof and pervious to gases.

It is further an object to have only a small portion of the exterior of the casing to be pervious to gases.

It is still another object to provide a battery casing design that provides an escape path for the exhaust gases emanating from the battery when the battery is snugly installed inside a cavity of an electrical appliance.

It is also an object to provide a moisture free electrical connection between the electrical terminals of the battery and the electrical appliance.

It is yet another object to provide a latching mechanism that allows the battery casing to lock into a battery cavity of an electrical appliance.

These and other objects may be achieved by a battery case made of a water proof, gas impervious material that encapsulates a plurality of battery cells. A small portion of the exterior of the casing is recessed inward from the surrounding regions and contains perforations, allowing gases to escape through gas pervious sheet materials placed in the recess over the perforations. Among the gas pervious sheet materials placed in the recess are a water-proof sheet made of Goretex or Celgard in addition to a perforated adhesive layer. The exterior of the battery casing is spotted with elastic spacers which provide room for exhaust gases which have exited the battery casing to escape when the battery casing is snugly installed inside a cavity of an electrical appliance. The exterior of the battery casing also contains an electrical connector that is surrounded by a seal member, such that when pressed against a cavity wall of the electrical appliance, the seal member forms a watertight seal keeping the electrical connection between the terminal of the battery and the electrical appliance free from moisture. Finally, the battery casing contains a gripping mechanism that locks the battery to the electrical appliance when the battery is properly installed in a battery cavity in an electrical appliance.

DETAILED DESCRIPTION OF THE PREFERRED EMBODIMENTS

Nickel metal hydride battery cells installed within a battery include a cylindrically wound laminate consisting of a positive electrode plate of a metal oxide, a negative electrode plate of a hydrogen retainer alloy and a separator plate interposed there between, a protective can for enclosing said cylindrically wound laminate and an electrolyte. The hydrogen retainer alloy is to absorb the hydrogen generated in the charging process to discharge it into the electrolyte during the discharging process.

Figure 1:
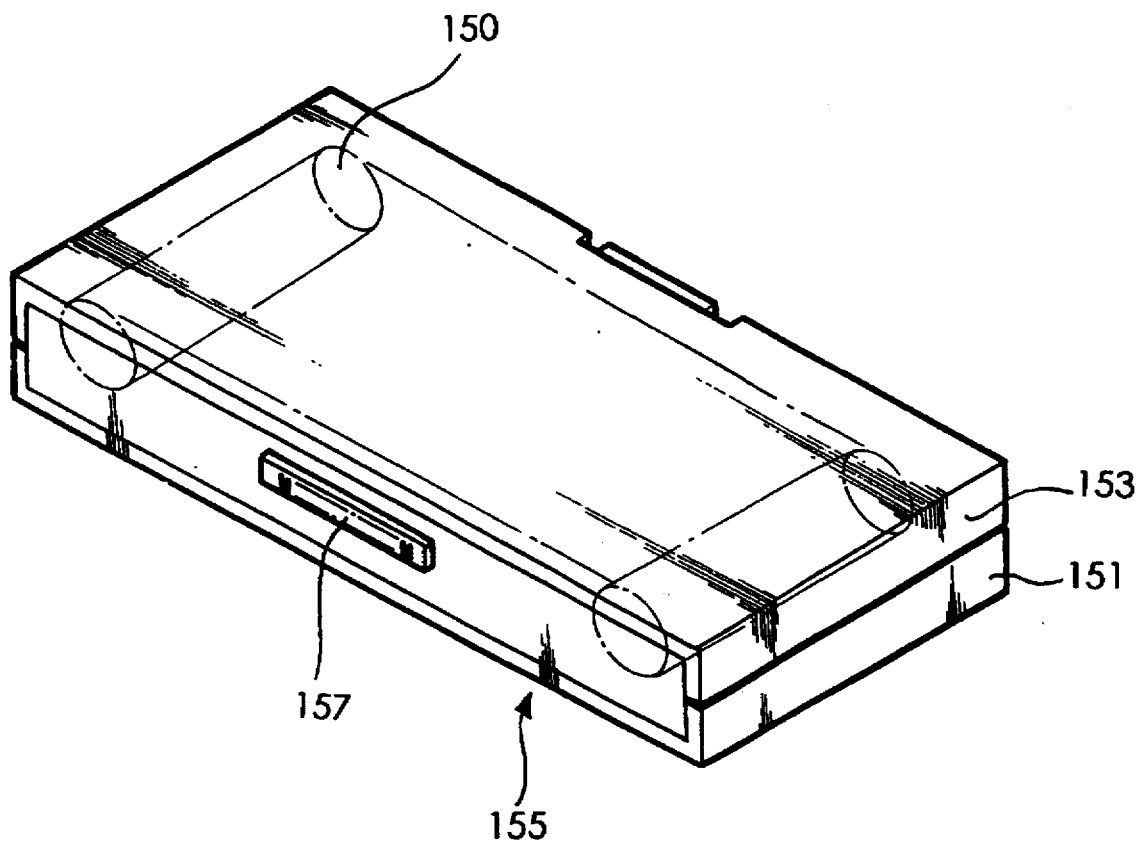
FIG. 1 is a perspective view illustrating an abstract representation of a several salient features commonly found in a conventional battery.
Figure 2:
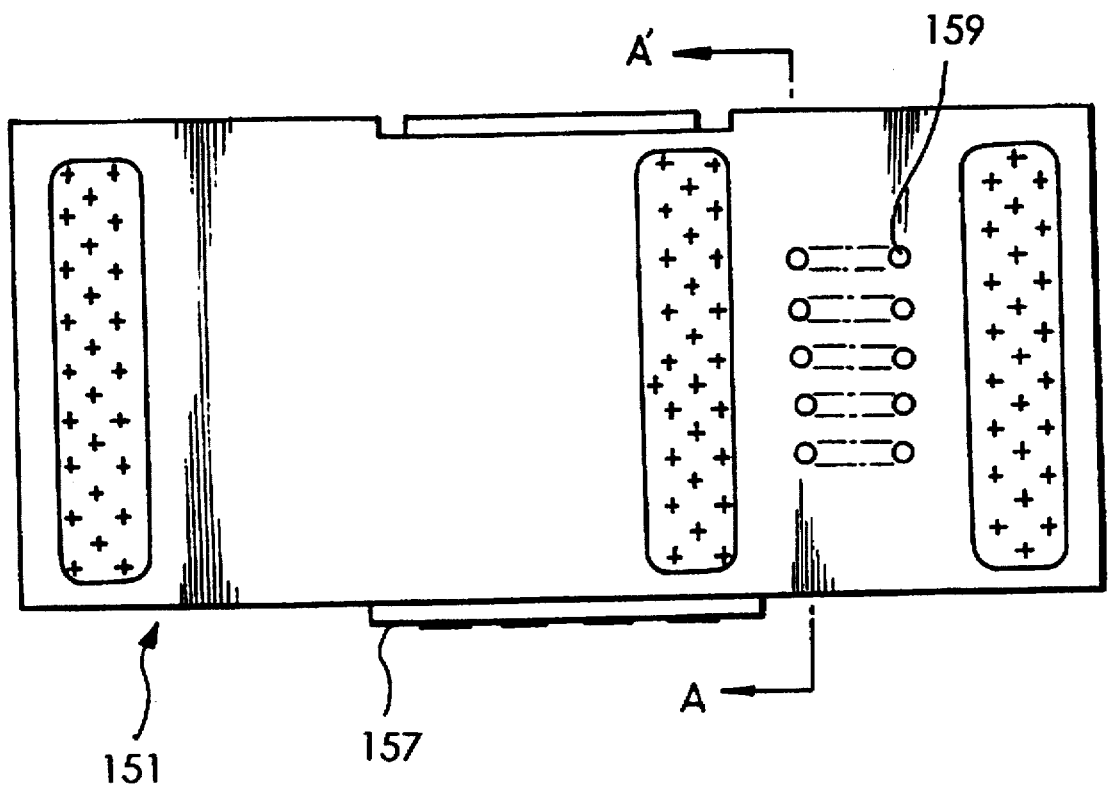
FIG. 2 is the bottom view of the battery of FIG. 1.
Figure 3:
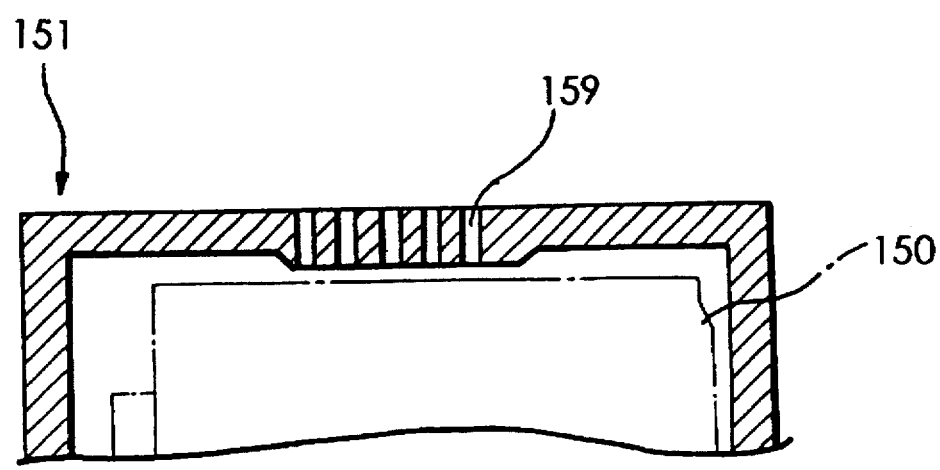
FIG. 3 is a cross sectional view taken along line A-A' in FIG. 2.

FIG. 1 illustrates an abstract representation of a conventional battery 155 having a plurality of battery cells 150 therein, battery 155 includes a lower case part 151 and an upper case part 153. Reference numeral 157 denotes an electrical connector for connecting the battery with an electronic apparatus. While the hydrogen gas generated during the discharging process is discharged into the electrolyte, a part thereof is also discharged outside through the fine pores formed on the battery cells 150. The hydrogen gas discharged to the outside of the battery cells finally passes out through a plurality of holes 159 formed in the battery as shown in FIGS. 2 and 3. Such a conventional battery however, suffers the drawback that water may pass through the holes 159 to damage the battery cells and the components of the electronic apparatus.

Figure 4:
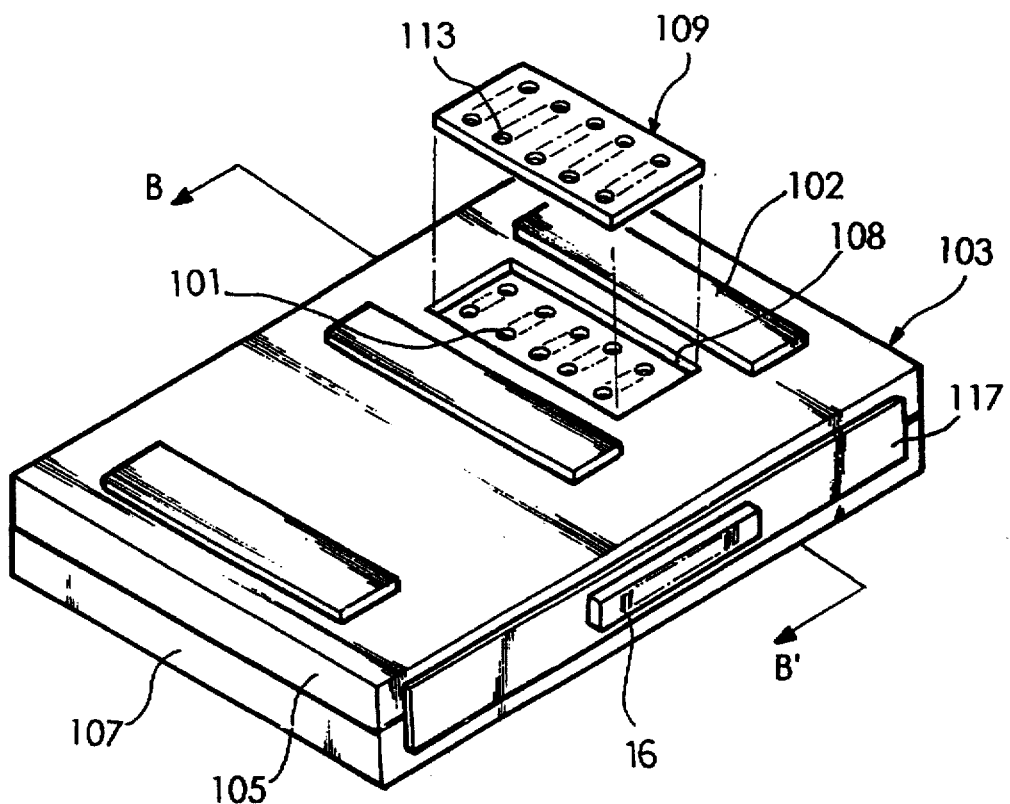
FIG. 4 is a perspective view showing bottom, rear and left sides of a battery according to an embodiment of the present invention.
Figure 11:
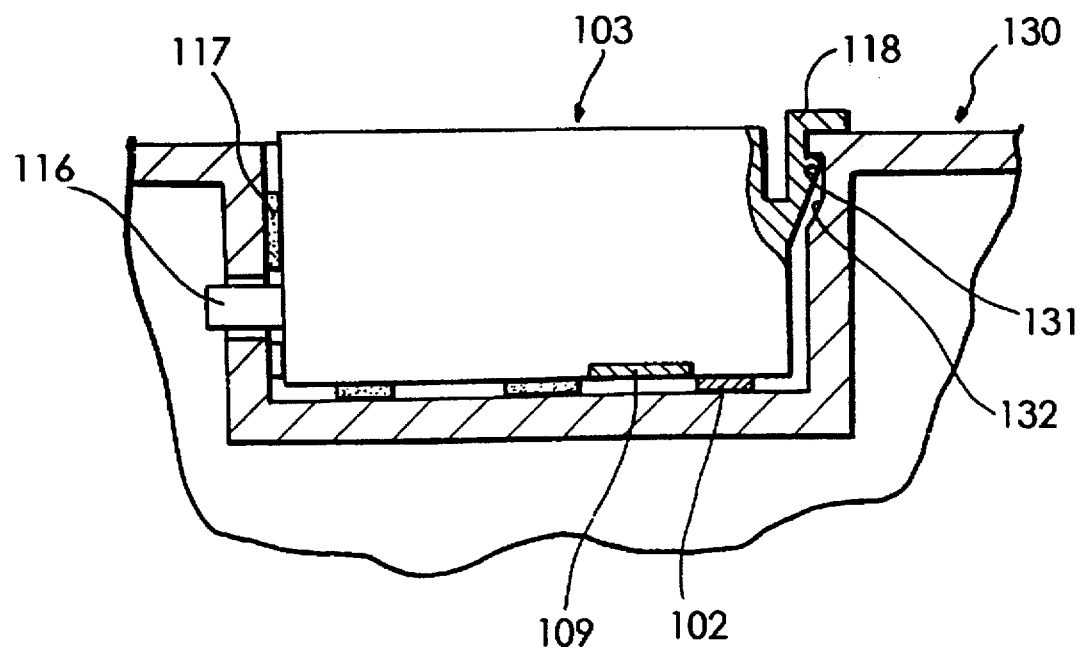
FIG. 11 is a partial cross sectional view illustrating the battery according to the present invention installed on a computer.

To prevent damage caused by moisture, while providing a mechanism to draw off exhaust gases from the battery, the battery 103 of the present invention, shown in FIG. 4, is presented. Battery 103 includes lower case part 105 and upper case part 107 assembled in a water-tight manner, containing an air-permeative water-proof device 109 which allows gas formed inside battery 103 to be expelled. A plurality of spacers 102 of an elastic material are provided on a face of battery 103 near where the air-permeative water-proof device 109 is located. As shown in FIG. 11, spacers 102 act as damping means and provide a discharge passage for the gas formed by battery 103. Seal member 117 is disposed around electrical connector 116 on the face of battery 103. When battery 103 is installed in electronic apparatus 130, seal member 117 is pressed against a face of the electronic apparatus 130 to prevent moisture from permeating into the electrical connector 116.

Figure 5:
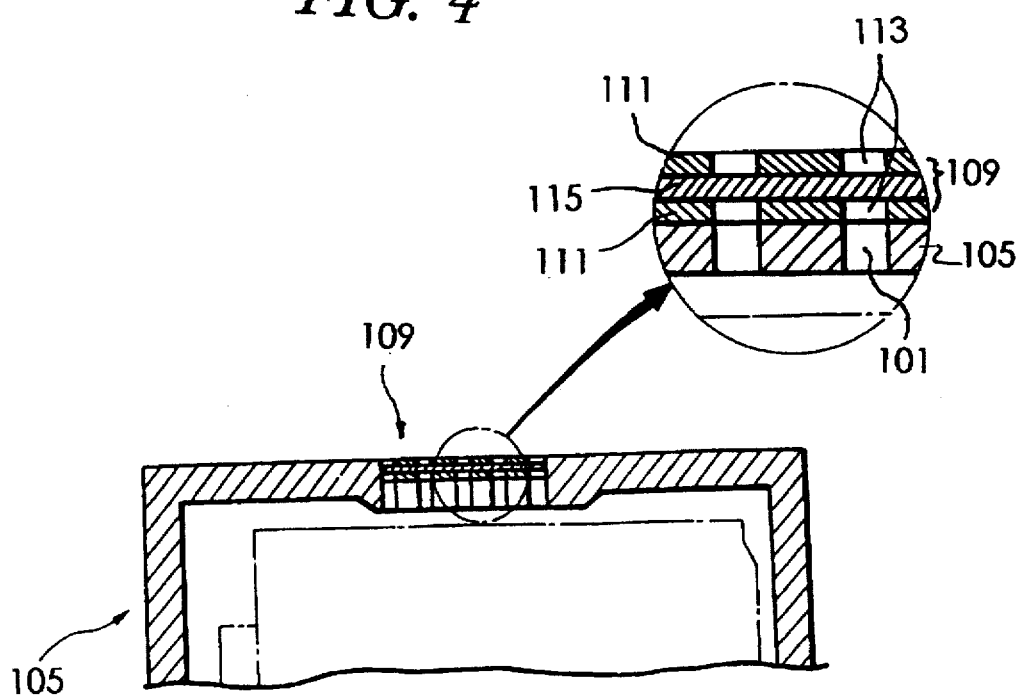
FIG. 5 is a cross sectional side view of FIG. 4 taken along line B-B' for illustrating the air-permeative water-proof device according to a first embodiment of the present invention.
Figure 6:
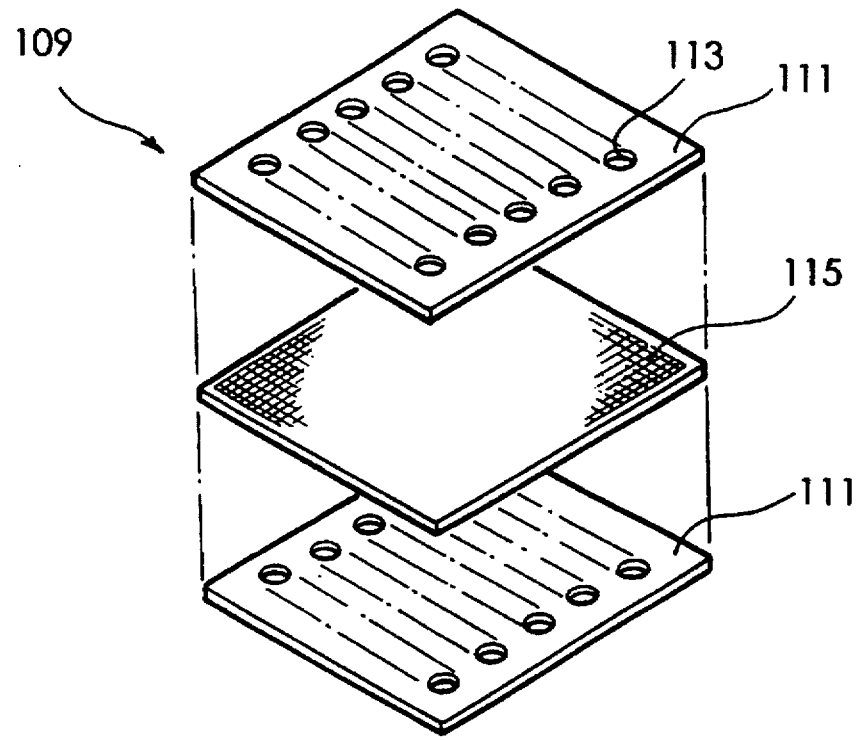
FIG. 6 is an exploded perspective view of the air-permeative water-proof device illustrated in FIG. 5 according to the first embodiment.
Figure 7:
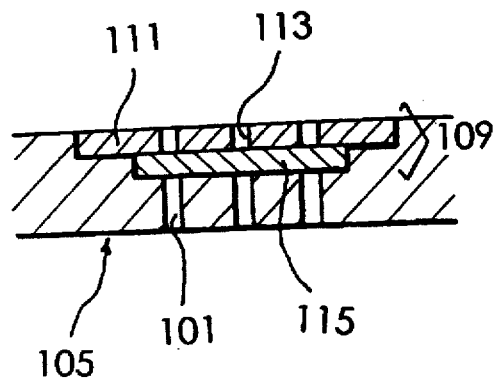
FIG. 7 is a cross sectional view of FIG. 4 taken along line B-B' of the air-permeative water-proof device according to a second embodiment of the present invention.

The first embodiment, shown in FIGS. 5 and 6, show air-permeative water-proof device 109 made up of an air-permeative water-proof sheet 115 sandwiched between two layers of a perforated adhesive sheets 111. Air-permeative water-proof sheet 115 is preferably made of a material with a trade name such as Gortex or Celguard. Goretex is made by sintering fine polymer particles of polytetrafluoroethylene while Celguard is fabricated by controlled stretching of polymer films of polypropylene. See Kirk-Othmer Encyclopedia of Chemical Technology, 3rd ed, vol 15, p 105. The perforations in the adhesive sheets 111 coincide with the perforations 101 in underlying lower case part 105. See the expansion of FIG. 5. Zone 108, forming the plurality of holes 101 in the lower case part 105, is recessed as shown in FIGS. 4 and 5, to provide room for air-permeative water-proof device 109. The second embodiment, shown in FIG. 7, show air-permeative water-proof device 109 made up of an air-permeative water-proof sheet 115 sandwiched between perforated adhesive sheet 111 on the outer side and perforated lower case part 105 on the inner side.

The hydrogen gas generated within the battery cell during the chemical reaction is partly discharged to the outside of the battery cell and collected in the battery 103, finally being discharged through the holes 101 and through air-permeative water-proof sheet 115 to the outside of the battery 103. Meanwhile, water is prevented from penetrating in through the air-permeative water-proof sheet 115 from the outside.

Figure 8:
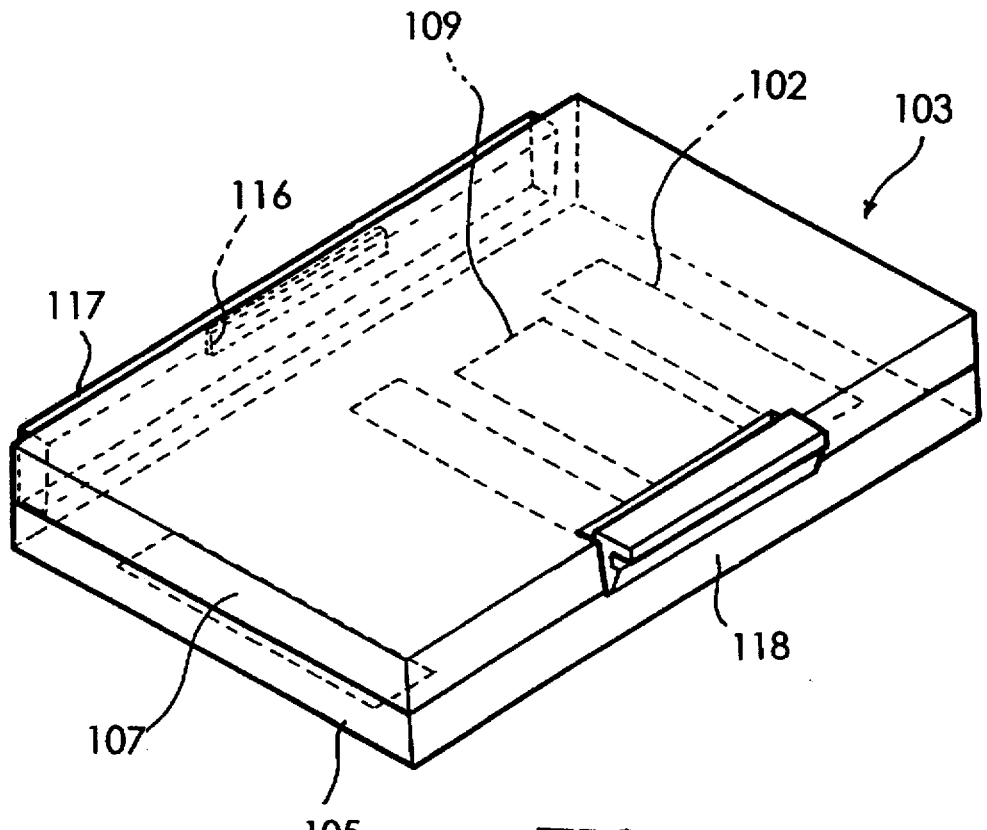
FIG. 8 is an upside-down view of the battery depicted in FIG. 4.
Figure 9:
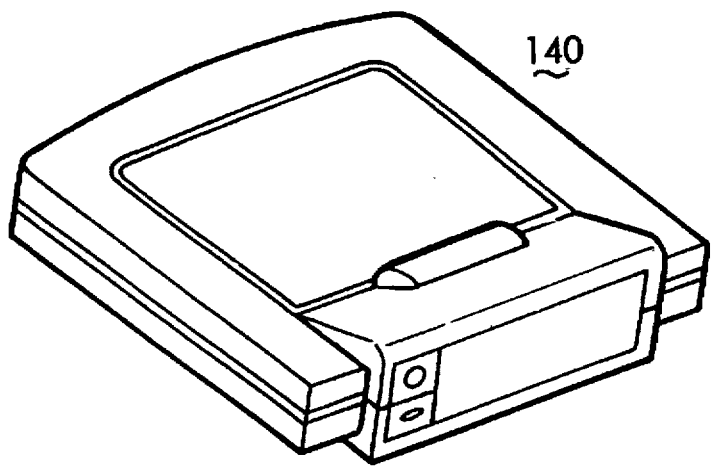
FIG. 9 is a perspective view showing top, front and left sides of a computer with the battery according to the present invention.
Figure 10:
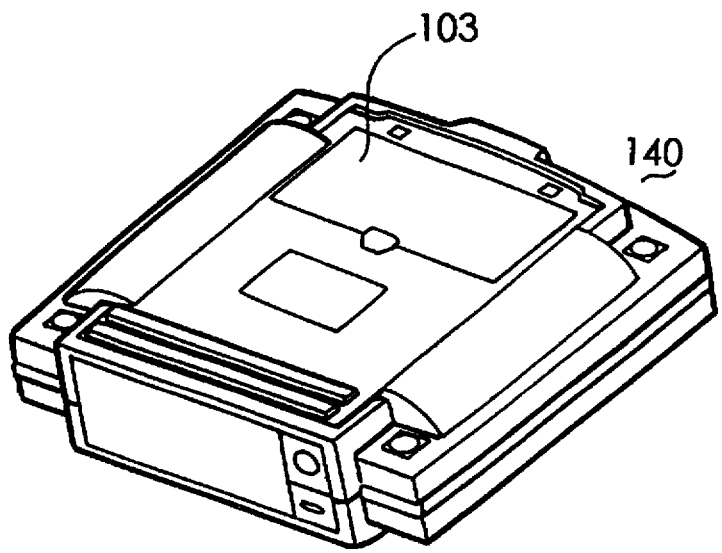
FIG. 10 is a perspective view showing bottom, front and left side of the computer depicted in FIG. 9.

FIG. 8 illustrates the underside of battery 103 according to the present invention, showing grip 118. FIG. 11 shows battery 103 mounted inside a battery cavity in electrical appliance 130. Here, grip 118 of battery 103 hooks to protrusion 131 on the upper edge of depression 132 on electronic device 130, securely locking battery 103 into electronic device 130. FIGS. 9 & 10 are examples of electronic devices and computer devices 140 in which water proof battery 103 is mounted into.

To illustrate an example of the electronic device on which the battery according to the present invention may be mounted, a computer 140 with a battery 103 is illustrated in FIGS. 9 and 10.

What is claimed is:

1. A battery comprising:
   a plurality of battery cells; and
   a case for encasing said battery cells, said case including a plurality of holes formed thereon for passing gas and air, an air-permeative water-proof sheet for covering said holes and passing the gas and air without passing water, and an adhesive sheet member for fixing said air-permeative water-proof sheet.

2. A battery as defined in claim 1, wherein said adhesive sheet member comprises more than two layers of adhesive sheets having a same size as said air-permeative water-proof sheet each with a plurality of holes corresponding to those of said case, and said air-permeative water-proof sheet being interposed between said adhesive sheets.

3. A battery as defined in claim 2, wherein a zone forming said plurality of holes in said case is depressed enough to fit a thickness of a combined structure of said adhesive sheets containing said air-permeative water-proof sheet.

4. A battery as defined in claim 1, wherein said adhesive sheet member includes an adhesive sheet with a plurality of holes corresponding to those of said air-permeative water-proof sheet being interposed between said adhesive sheet and said holes of said case.

5. A battery as defined in claim 1, further comprising a spacer of an elastic material provided on a face of said case whereon said air-permeative means is provided, said spacer defining an air passage between said electronic apparatus and said battery when said battery is mounted on said electronic apparatus.

6. A battery as defined in claim 1, further comprising an electrical connector provided on a face of said case and a seal member disposed around said electrical connector, said seal member being pressed against a face of the electronic apparatus to prevent the water permeating into said electrical connector when said battery is installed on the electronic apparatus.

7. A portable electronic apparatus comprising:

a cavity formed therein; and a battery mounted on said cavity, said battery comprising a plurality of battery cells, and a case for encasing said battery cells, said case including a plurality of holes formed thereon for passing gas and air, an air-permeative water-proof sheet for covering said holes and passing the gas and air without passing water, and an adhesive sheet member for fixing said air-permeative water-proof sheet.

8. A portable electronic apparatus as defined in claim 7, further comprising a spacer of an elastic material provided on a face of said case of said battery whereon said air-permeative means is provided, said spacer defining an air passage between said electronic apparatus and said battery when said battery is mounted on said electronic apparatus.

9. A portable electronic apparatus as defined in claim 7, further comprising an electrical connector provided on a face of said battery and a seal member disposed around said electrical connector, said seal member being pressed against a face of the electronic apparatus to prevent the water permeating into said electrical connector when said battery is installed on the electronic apparatus.

10. A portable electronic apparatus as defined in claim 7, wherein said adhesive sheet member comprises more than one layer of adhesive sheet having the same size as said air-permeative water-proof sheet each with a plurality of holes corresponding to those of said case, and said air-permeative water-proof sheet being interposed between said adhesive sheet and said holes of said case.

11. A portable electronic apparatus as defined in claim 7, wherein a zone forming said plurality of holes in said case is depressed enough to fit a thickness of a combined structure of said adhesive sheet containing said air-permeative water-proof sheet.

12. A battery case, comprising:

a housing containing a solid first region and a perforated second region;

a first perforated adhesive sheet covering said second region;

an air-permeative water-proof sheet coveting said first perforated adhesive sheet; and a second perforated adhesive sheet covering said air-permeative water-proof sheet.

13. The battery case of claim 12 wherein said second region of said housing is recessed inward from said first region, allowing said second region to become flush with said first region when said second region is filled by said first perforated adhesive sheet, said air-permeative water-proof sheet, and said second perforated adhesive sheet.

14. The battery of claim 13, where said air-permeative water-proof sheet is made of polytetrafluoroethylene.

15. The battery of claim 13, where said air-permeative water-proof sheet is made of a stretched film of polypropylene.

16. A battery case, comprising:

an encapsulating battery housing containing a solid first region and a perforated second region;

an air-permeative water-proof sheet covering said perforated second region; and a perforated adhesive sheet covering said air-permeative water-proof sheet.

17. The battery case of claim 16, where said second region is recessed inward from said first region allowing said second region to become flush with said first region when said second region is covered by said air-permeative water-proof sheet and said perforated adhesive sheet.

18. The battery case of claim 17, where said air-permeative water-proof sheet is made of polytetrafluoroethylene.

19. The battery case of claim 12, containing a griping mechanism that latches on to a protrusion on an electrical device when said battery is placed in a battery cavity in said electrical device.

20. The battery case of claim 19, further containing an electrical terminal on the exterior, said electrical terminal surrounded by a seal member.

21. The battery case of claim 20, where a watertight seal forms between said battery case and said cavity wall of said electrical device when said battery is installed in said battery cavity in said electrical device preventing moisture from coming into contact with said electrical terminal.

* * * * *